United States Patent
Higa et al.

(10) Patent No.: US 9,196,042 B2
(45) Date of Patent: *Nov. 24, 2015

(54) FEELING-EXPRESSING-WORD PROCESSING DEVICE, FEELING-EXPRESSING-WORD PROCESSING METHOD, AND FEELING-EXPRESSING-WORD PROCESSING PROGRAM

(75) Inventors: Kyota Higa, Tokyo (JP); Toshiyuki Nomura, Tokyo (JP); Yuzo Senda, Tokyo (JP)

(73) Assignee: NEC CORPORATION, Tokyo (JP)

(*) Notice: Subject to any disclaimer, the term of this patent is extended or adjusted under 35 U.S.C. 154(b) by 267 days.

This patent is subject to a terminal disclaimer.

(21) Appl. No.: 13/824,453

(22) PCT Filed: Nov. 15, 2011

(86) PCT No.: PCT/JP2011/076294
§ 371 (c)(1),
(2), (4) Date: Apr. 5, 2013

(87) PCT Pub. No.: WO2012/070430
PCT Pub. Date: May 31, 2012

(65) Prior Publication Data
US 2013/0279747 A1    Oct. 24, 2013

(30) Foreign Application Priority Data
Nov. 24, 2010 (JP) ................. 2010-261229

(51) Int. Cl.
*G06T 7/00* (2006.01)
*G06K 9/00* (2006.01)
*G06F 17/30* (2006.01)

(52) U.S. Cl.
CPC ............ *G06T 7/004* (2013.01); *G06F 17/3079* (2013.01); *G06F 17/30811* (2013.01);
(Continued)

(58) Field of Classification Search
CPC .......... G06K 9/00221; G06K 9/00261; G06K 9/00302; G06K 9/00308; G06K 9/00335; G06K 9/00375; G06K 9/00382; G06K 9/00389; G06F 17/30793

USPC ............................................. 382/118
See application file for complete search history.

(56) References Cited

U.S. PATENT DOCUMENTS 6,619,860 B1 * 9/2003 Simon ........................ 382/112
7,607,097 B2  10/2009 Janakiraman et al.
(Continued)

FOREIGN PATENT DOCUMENTS

JP    2003-018462    1/2003
JP    2003-289499    10/2003
(Continued)

OTHER PUBLICATIONS

Hanjalic, et al. "Affective Video Content Repreentation and Modeling." IEEE Transactions on Multimedia. 7.1 (2005): 143-153. Print.*
(Continued)

*Primary Examiner* — Michael A Newman
(74) *Attorney, Agent, or Firm* — Young & Thompson

(57) ABSTRACT

The present approach enables an impression of the atmosphere of a scene or an object present being photographed to be pictured in a person's mind as if the person were actually at the photographed scene. A feeling-expressing-word processing device has: a feeling information calculating unit for analyzing a photographed image, and calculating feeling information which indicates a situation of a scene portrayed in the photographed image, a condition of an object present in the scene, a temporal change in the scene, or a movement of the object; a feeling-expressing-word extracting unit for extracting, from among feeling-expressing words which express feelings and are stored in a feeling-expressing-word database in association with the feeling information, a feeling-expressing word which corresponds to the feeling information calculated by the feeling information calculating unit; and a superimposing unit for superimposing the feeling-expressing word extracted by the feeling-expressing-word extracting unit on the photographed image.

8 Claims, 22 Drawing Sheets

(52) U.S. Cl.
CPC ........ *G06K9/00221* (2013.01); *G06K 9/00684* (2013.01); *G06F 17/30793* (2013.01); *G06K 9/00302* (2013.01); *G06K 9/00308* (2013.01); *G06K 9/00671* (2013.01)

(56) References Cited

U.S. PATENT DOCUMENTS

| | | | |
|---|---|---|---|
| 2003/0108241 A1* | 6/2003 | Colmenarez et al. | 382/181 |
| 2003/0165270 A1* | 9/2003 | Endrikhovski et al. | 382/189 |
| 2004/0101212 A1* | 5/2004 | Fedorovskaya et al. | 382/305 |
| 2005/0102246 A1* | 5/2005 | Movellan et al. | 706/12 |
| 2006/0047515 A1 | 3/2006 | Connors | |
| 2007/0154110 A1* | 7/2007 | Wen et al. | 382/276 |
| 2007/0294273 A1* | 12/2007 | Bendeck et al. | 707/101 |
| 2008/0275830 A1* | 11/2008 | Greig | 706/21 |
| 2008/0312949 A1* | 12/2008 | Nagasaka et al. | 705/1 |
| 2009/0051826 A1* | 2/2009 | Chang | 348/744 |
| 2009/0222388 A1 | 9/2009 | Hua et al. | |
| 2009/0285456 A1* | 11/2009 | Moon et al. | 382/118 |
| 2010/0123804 A1 | 5/2010 | Tsai | |
| 2011/0263946 A1* | 10/2011 | el Kaliouby et al. | 600/300 |
| 2011/0263964 A1 | 10/2011 | Bernhardt et al. | |

FOREIGN PATENT DOCUMENTS

| | | | |
|---|---|---|---|
| JP | 2003-346162 | | 12/2003 |
| JP | 2007-233517 | | 9/2007 |
| JP | 2009-141516 | | 6/2009 |
| JP | 2010-066844 | | 3/2010 |
| JP | 2010066844 A | * | 3/2010 |
| WO | 2006106750 | | 10/2006 |

OTHER PUBLICATIONS

Joho, et al. "Exploiting Facial Expression for Affective Video Summarisation." CIVR '09. (2009): 1-8. Print.*

Chen, et al. "Emotion-Based Music Visualization Using Photos." MMM 2008, LNCS. 4903. (2008): 358-368. Print.*

International Search Report PCT/JP2011/076294 dated Jan. 24, 2013, with English translation.

Hogan, Kevin, Reading Body Language: Interpret Body Language, "In Just a Few Minutes From Now, You Could Be Reading & Interpreting Body Language Like a Pro . . . and Using It to Become a Money and People Magnet", KevinHogan.com, The Resource Center, N.p., Sep. 12, 2008, Web. Mar. 8, 2015, https://web.archive.org/web/20080912232739/http://www.kevinhogan.com./bodylanguage.htm.

McNeill, David, "Hand and Mind: What Gestures Reveal about Thought", Chicago, The University of Chicago Press, 1995, pp. 105-133.

* cited by examiner

Fig. 2

| NUMBER OF FACES | FEELING-EXPRESSING-WORD |
|---|---|
| 0 | SHIIN |
| 1 | NIKO |
| 2 OR MORE | WAI WAI |

Fig. 3

| TILT OF FACE 1 | TILT OF FACE 2 | FEELING-EXPRESSING-WORD |
|---|---|---|
| 0~90 | −90~0 | RABU RABU ICHA ICHA |
| −90~0 | 0~90 | RABU RABU ICHA ICHA |

Fig. 4

| DEGREE OF SMILE (QUANTIFIED VALUE) | FEELING-EXPRESSING-WORD |
|---|---|
| 0.0 OR MORE AND LESS THAN 0.1 | HA, FU |
| 0.1 OR MORE AND LESS THAN 0.2 | FUFU, MUFU |
| 0.2 OR MORE AND LESS THAN 0.3 | FUFUFU, MUFUFU |
| 0.3 OR MORE AND LESS THAN 0.4 | UFU, UFUFU |
| 0.4 OR MORE AND LESS THAN 0.5 | EHE, EHEHE |
| 0.5 OR MORE AND LESS THAN 0.6 | NIYA, NIYARI |
| 0.6 OR MORE AND LESS THAN 0.7 | KYAHA, NIPA |
| 0.7 OR MORE AND LESS THAN 0.8 | NIKO, AHAHA |
| 0.8 OR MORE AND LESS THAN 0.9 | KIRA, NINMARI |
| 0.9 OR MORE AND 1.0 OR LESS | NIKO NIKO, KIRA KIRA |

Fig. 7

| NUMBER OF FINGERS | FEELING-EXPRESSING-WORD |
|---|---|
| 0 | GUU |
| 2 | PIISU |
| 5 | PAH |

Fig. 10

| DIRECTION OF MOTION VECTOR | QUANTIFIED VALUE |
|---|---|
| NEGATIVE WITH RESPECT TO HORIZONTAL AXIS | 0 |
| POSITIVE WITH RESPECT TO HORIZONTAL AXIS | 1 |
| NEGATIVE WITH RESPECT TO VERTICAL AXIS | 2 |
| POSITIVE WITH RESPECT TO VERTICAL AXIS | 3 |

Fig. 11

| NUMBER OF DYNAMIC BODIES | FEELING-EXPRESSING-WORD |
|---|---|
| 0 | SHIIN |
| 1 | URO URO |
| 2 | ISO ISO |
| 3 | SEKA SEKA |
| 4 | ZAWA ZAWA |
| 5 OR MORE | GOCHA GOCHA |

Fig. 12

| TRAVEL DISTANCE OF DYNAMIC BODY (QUANTIFIED VALUE) | FEELING-EXPRESSING-WORD |
|---|---|
| 0.0 OR MORE AND LESS THAN 0.1 | YORO YORO |
| 0.1 OR MORE AND LESS THAN 0.2 | FURA FURA |
| 0.2 OR MORE AND LESS THAN 0.3 | TORO TORO |
| 0.3 OR MORE AND LESS THAN 0.4 | SORO SORO |
| 0.4 OR MORE AND LESS THAN 0.5 | TEKU TEKU |
| 0.5 OR MORE AND LESS THAN 0.6 | TOKO TOKO |
| 0.6 OR MORE AND LESS THAN 0.7 | SUTA SUTA |
| 0.7 OR MORE AND LESS THAN 0.8 | SEKA SEKA |
| 0.8 OR MORE AND LESS THAN 0.9 | PYUU |
| 0.9 OR MORE AND 1.0 OR LESS | DASSHU |

Fig. 13

| DYNAMIC BODY TRANSITION INFORMATION | FEELING-EXPRESSING-WORD |
|---|---|
| 0101<br>1010 | URO URO |
| 0000<br>1111 | SUTA SUTA |
| 2323<br>3232 | PYON PYON |

Fig. 14

| LUMINANCE CHANGE (QUANTIFIED VALUE) | FEELING-EXPRESSING-WORD |
|---|---|
| −1 | HYUN |
| 1 | PIKA |

FEELING-EXPRESSING-WORD PROCESSING DEVICE, FEELING-EXPRESSING-WORD PROCESSING METHOD, AND FEELING-EXPRESSING-WORD PROCESSING PROGRAM

BACKGROUND

The present invention relates to a feeling-expressing-word processing device, a feeling-expressing-word processing method, and a feeling-expressing-word processing program.

We sometimes desire to convey an atmosphere of a certain place to another person from afar. In such a case, by taking a photograph of one's surroundings with a camera or the like and showing them to the other person, an atmosphere of the place where the photograph was taken can be conveyed. However, simply taking a photograph of a scene with a camera or the like is insufficient when attempting to fully convey the atmosphere of the place where the photograph was taken. An example of a technique for solving such a problem involves a character inserting device described in Patent Document 1. According to this character inserting device, a character-added image is generated by converting auditory information such as contents of conversation or ambient sound at the time of photography into characters and inserting the converted characters into a photographed image.

Patent Document 1: Patent Publication JP-A-2003-18462

A person pictures, in his or her mind, an impression of the atmosphere of a scene or an object present at the scene portrayed in a photographed image based on visual information such as a situation of the scene, a condition of the object, a temporal change in the scene, and a movement of the object. For example, when viewing an image portraying a bustle with a large number of people, one may feel that the scene is "gocha gocha (word describing a jumble or a mess)". On the other hand, when viewing an image portraying the inside of an office with nobody moving around even though there are a similar large number of people, one may feel that the scene is "shiin (word describing dead silence)". However, there may be cases where visual information such as a situation of a scene, a condition of an object, a temporal change in the scene, and a movement of the object cannot be readily recognized from what is portrayed in a photographed image. In such cases, if characters expressing visual information can be viewed, an impression of the atmosphere of a scene or an object present in the scene can be pictured more clearly.

Since the character inserting device described in Patent Document 1 inserts characters converted from auditory information into an image, the character inserting device is unable to express an impression of the atmosphere of a scene or an object present in the scene which is obtained from visual information.

SUMMARY

The present invention has been made in order to solve the problem described above, and an object thereof is to provide a feeling-expressing-word processing device, a feeling-expressing-word processing method, and a feeling-expressing-word processing program which enable an impression of the atmosphere of a scene or an object present in the scene at the time of photography to be pictured in a person's mind as though the person was actually at the photographed scene.

A feeling-expressing-word processing device according to the present invention has: a feeling information calculating unit for analyzing a photographed image, and calculating feeling information which indicates a situation of a scene portrayed in the photographed image, a condition of an object present in the scene, a temporal change in the scene, or a movement of the object; a feeling-expressing-word extracting unit for extracting, from among feeling-expressing words which express feelings and are stored in advance in association with the feeling information, a feeling-expressing word which corresponds to the feeling information calculated by the feeling information calculating unit; and a superimposing unit for superimposing the feeling-expressing word extracted by the feeling-expressing-word extracting unit on the image.

A feeling-expressing-word processing method according to the present invention includes: a feeling information calculating step of analyzing a photographed image, and calculating feeling information which indicates a situation of a scene portrayed in the photographed image, a condition of an object present in the scene, a temporal change in the scene, or a movement of the object; a step of extracting, from among feeling-expressing words which express feelings and are stored in advance in association with the feeling information, a feeling-expressing word which corresponds to the feeling information calculated by the feeling information calculating unit; and a superimposing step of superimposing the feeling-expressing word extracted in the feeling-expressing-word extracting step on the image.

A feeling-expressing-word processing program according to the present invention causes a computer to execute the steps included in the feeling-expressing-word processing method described above.

According to the present invention, an impression of the atmosphere of a scene or an object present in the scene at the time of photography can be pictured in a person's mind as though the person was actually at the photographed scene.

DESCRIPTION OF THE DRAWINGS

FIG. 2 is a diagram illustrating a data configuration of a number of faces table;

FIG. 3 is a diagram illustrating a data configuration of a face tilt table;

FIG. 4 is a diagram illustrating a data configuration of a degree of smile table;

FIG. 7 is a diagram illustrating a data configuration of a number of fingers table;

FIG. 10 is a diagram illustrating a data configuration of a direction quantifying table;

FIG. 11 is a diagram illustrating a data configuration of a number of dynamic bodies table;

FIG. 12 is a diagram illustrating a data configuration of a dynamic body travel distance table;

FIG. 13 is a diagram illustrating a data configuration of a dynamic body transition information table;

FIG. 14 is a diagram illustrating a data configuration of a luminance change table;

DETAILED DESCRIPTION

Figure 1:
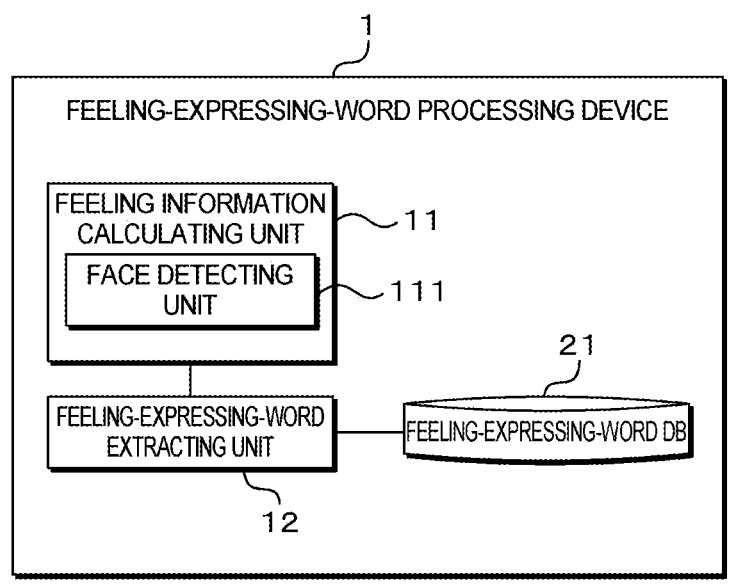
FIG. 1 is a block diagram illustrating a configuration of a feeling-expressing-word processing device according to a first embodiment.

Hereinafter, preferred embodiments of a feeling-expressing-word processing device, a feeling-expressing-word processing method, and a feeling-expressing-word processing program according to the present invention will be described with reference to the accompanying drawings.

The feeling-expressing-word processing device, the feeling-expressing-word processing method, and the feeling-expressing-word processing program according to the present invention analyze an inputted photographed image to calculate feeling information, and based on the feeling information, extract and output a feeling-expressing-word corresponding to a situation of a scene portrayed in the photographed image, a condition of an object in the scene, a change in the scene, or a movement of the object.

Examples of the photographed images include a single frame image (hereinafter, referred to as a "still image") comprising a video signal and a group of frame images (hereinafter, referred to as a "moving image").

Feeling information is information indicating a situation of a scene portrayed in the photographed image, a condition of an object in the scene, a temporal change in the scene, or a movement of the object. Examples of information indicating a situation of a scene or a condition of an object in the scene include number of peoples' faces, a tilt of a face, a degree of a smile, and number of extended fingers. Examples of information indicating a temporal change in a scene or a movement of an object include number of regions with significant movement (hereinafter, referred to as "dynamic bodies"), a travel distance of a dynamic body, transition information of a dynamic body, and a change in luminance of an image due to lighting being turned on or off (hereinafter, referred to as "luminance change").

Feeling-expressing words are words which express, based on visual information such as a situation of a scene portrayed in a photographed image, a condition of an object in the scene, a temporal change in the scene, or a movement of the object, an impression (a feeling) of the atmosphere of the scene or the object as received by a person having viewed the photographed image. Typical feeling-expressing words include onomatopoeic words and mimetic words. An example of an onomatopoeic word is "wai wai (word describing a large number of people behaving boisterously; making a din)" which expresses a boisterous atmosphere of the scene. An example of a mimetic word is "noro noro (word describing moving slowly; sluggishly) which expresses a slow movement of a dynamic body.

[First Embodiment]

A feeling-expressing-word processing device according to a first embodiment represents an example where a signal of a still image is inputted as an input signal, the number of peoples' faces, a tilt of a face, or a degree of a smile in the still image is calculated as feeling information, and a feeling-expressing word corresponding to the feeling information is extracted and outputted.

First, a configuration of the feeling-expressing-word processing device according to the first embodiment will be described with reference to FIG. 1.

A feeling-expressing-word processing device 1 is physically configured so as to include, for example, a CPU (central processing unit), a storage device, and an input/output interface. For example, the storage device contains elements of a ROM (read only memory) and an HDD (hard disk drive) which store programs and data processed by the CPU, a RAM (random access memory) which is mainly used as various work areas for control processing, and the like. These elements are connected with one another via a bus. By executing programs stored in the ROM to process signals received via the input/output interface and data deployed on the RAM, the CPU is capable of realizing functions of various units (to be described later) which constitute the feeling-expressing-word processing device 1.

As shown in FIG. 1, the feeling-expressing-word processing device according to the first embodiment functionally includes a feeling information calculating unit 11 and a feeling-expressing-word extracting unit 12. The feeling information calculating unit 11 includes a face detecting unit 111.

The face detecting unit 111 detects faces by analyzing an inputted still image, and calculates feeling information by calculating the number of faces, a tilt of a face, or a degree of a smile. For example, a technique described in Patent Publication JP-A-2007-233517 can be used as a method for calculating the number of faces or the tilt of a face. In addition, for example, a technique described in Patent Publication JP-A-2009-141516 can be used as a method for calculating the degree of a smile.

The feeling-expressing-word extracting unit 12 extracts a feeling-expressing-word corresponding to the feeling information calculated by the feeling information calculating unit 11 from a feeling-expressing-word database 21 and outputs the extracted feeling-expressing-word. For example, text data, still image metadata such as Exif (exchangeable image file format), tag information for moving picture search, and audio/acoustic data associated in advance with feeling-expressing words can be used as a data format for outputting feeling-expressing words.

The feeling-expressing-word database 21 has one or a plurality of tables which indicates a correspondence relationship between feeling information and feeling-expressing words. The correspondence relationship between feeling information and feeling-expressing words may be any of one-to-one, one-to-many, many-to-one, and many-to-many. When a plurality of feeling-expressing words is associated with one piece of feeling information, a feeling-expressing word may be selected randomly, selected according to a predetermined order, or selected according to other criteria.

The feeling-expressing-word database 21 according to the first embodiment has a number of faces table, a face tilt table, and a degree of smile table.

A data configuration of the number of faces table will be described with reference to FIG. 2. Examples of data items of the number of faces table include a number of faces item and a feeling-expressing-word item. The number of faces item stores the number of faces detected by the face detecting unit 111. The feeling-expressing-word item stores feeling-expressing-words corresponding to the number of faces. As the feeling-expressing words in the number of faces table, words that more dramatically express the excitement at a scene are used in proportion to the number of faces.

Using the number of faces table shown in FIG. 2, "shiin" is extracted as a feeling-expressing word when the number of faces is "0", "niko (word describing someone smiling)" is extracted as a feeling-expressing word when the number of faces is "1", and "wai wai" is extracted as a feeling-expressing word when the number of faces is "2" or more.

A data configuration of the face tilt table will be described with reference to FIG. 3. Examples of data items of the face tilt table include a tilt of face 1 item, a tilt of face 2 item, and a feeling-expressing-word item. The tilt of face 1 item and the tilt of face 2 item respectively store the tilt of faces detected by the face detecting unit 111. A tilt of a face is expressed using values ranging from "−90" degrees to "90" degrees, where a face turned straight forward is assumed to have an angle of "0" and a clockwise rotation from a straight-forward state is assumed to be positive. Therefore, when two faces side by side are tilted so as to face each other, the tilt of face 1 and the tilt of face 2 respectively have positive and negative values. Feeling-expressing words corresponding to the tilt of face 1 and the tilt of face 2 are stored in the feeling-expressing word item. As the feeling-expressing words in the face tilt table, words that more deeply express intimacy are used as the tilts of two faces side by side increase in directions approaching each other.

Using the face tilt table shown in FIG. 3, "rabu rabu (Japanese transcription of "love love" roughly corresponding to lovey-dovey) or "icha icha (word roughly corresponding to kissy-kissy or lovey-dovey)" is extracted as a feeling-expressing word when the tilt of face 1 ranges from "0" to "90" and the tilt of face 2 ranges from "−90" to "0", and "rabu rabu" or "icha icha" is extracted as a feeling-expressing word when the tilt of face 1 ranges from "−90" to "0" and the tilt of face 2 ranges from "0" to "90".

A data configuration of the degree of smile table will be described with reference to FIG. 4. Examples of data items of the degree of smile table include a degree of smile item and a feeling-expressing-word item. The degree of smile item stores a range of a degree of a smile detected by the face detecting unit 111. A degree of a smile is expressed using a value normalized so as to range from "0.0" to "1.0". The feeling-expressing-word item stores feeling-expressing-words corresponding to the degree of smile. As the feeling-expressing words in the degree of smile table, words that more dramatically express happiness or joy are used as the degree of smile increases, and words that more dramatically express anger or sadness are used as the degree of smile decreases.

Using the degree of smile table shown in FIG. 4, "ha (word roughly corresponding to oh, ah, or phew)" or "fu (word roughly corresponding to phew)" is extracted as a feeling-expressing word when the degree of smile is equal to or higher than "0.0" and lower than "0.1", "fufu (word roughly corresponding to ha ha; a giggling sound)" or "mufu (word roughly corresponding to hum; a giggling sound)" is extracted as a feeling-expressing word when the degree of smile is equal to or higher than "0.1" and lower than "0.2", and "niko niko (word describing someone smiling happily; all smiles)" or "kira kira (word roughly corresponding to twinkle twinkle; gleaming)" is extracted as a feeling-expressing word when the degree of smile is equal to or higher than "0.9" and equal to or lower than "1.0".

Moreover, the number of faces, the tilt of a face, and the degree of a smile may be expressed using values other than those described above. In addition, as feeling information, any one of the number of faces, the tilt of a face, and the degree of a smile may be used, or a plurality may be used in combination.

Figure 5:
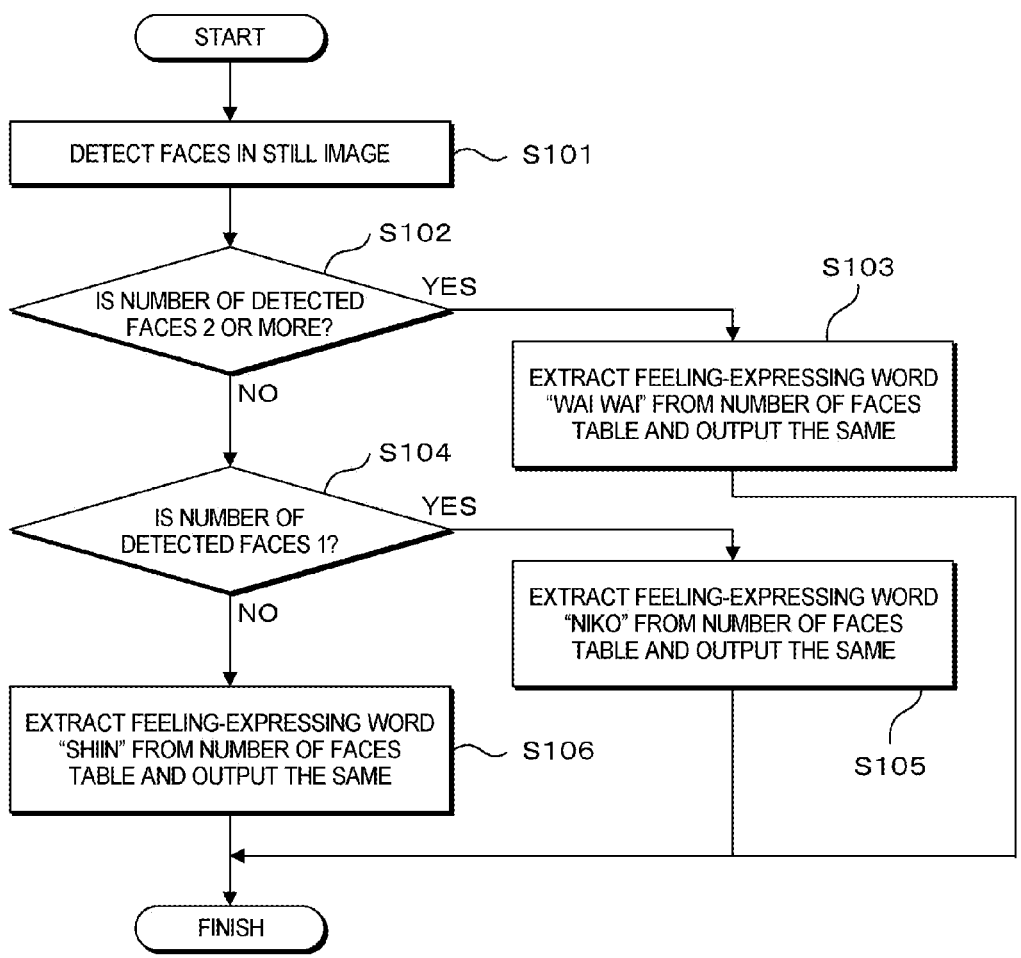
FIG. 5 is a flow chart for describing an operation of the feeling-expressing-word processing device according to the first embodiment.

Next, an operation of the feeling-expressing-word processing device according to the first embodiment will be described with reference to FIG. 5. For this operation example, a case where the number of faces is used as feeling information will be described.

First, when a signal of a still image is inputted to the feeling-expressing-word processing device 1, the face detecting unit 111 of the feeling information calculating unit 11 detects faces portrayed in the still image (step S101).

Subsequently, the feeling-expressing-word extracting unit 12 judges whether or not the number of faces detected in step S101 is 2 or more (step S102). When a "yes" judgment is made (YES in step S102), the feeling-expressing-word extracting unit 12 extracts and outputs the feeling-expressing word "wai wai" which is stored in association with "2 or more" faces from the number of faces table of the feeling-expressing-word database 21 shown in FIG. 2 (step S103). Subsequently, the present operation is terminated.

On the other hand, when it is judged in step S102 that the number of faces is not 2 or more (NO in step S102), the feeling-expressing-word extracting unit 12 judges whether or not the number of faces is 1 (step S104). When a "yes" judgment is made (YES in step S104), the feeling-expressing-word extracting unit 12 extracts and outputs the feeling-expressing word "niko" which is stored in association with "1" face from the number of faces table (step S105). Subsequently, the present operation is terminated.

On the other hand, when it is judged in step S104 that the number of faces is not 1 (NO in step S104), the feeling-expressing-word extracting unit 12 extracts and outputs the feeling-expressing word "shiin" which is stored in association with "0" faces from the number of faces table (step S106). Subsequently, the present operation is terminated.

As described above, with the feeling-expressing-word processing device 1 according to the first embodiment, feeling-expressing words corresponding to the number of faces, a tilt of a face, or a degree of a smile in a still image can be extracted and outputted. Accordingly, since a situation of a scene or a condition of an object present in the scene at the time of photography of a still image can be clarified and emphasized, an impression of the atmosphere of the scene or the object can be pictured in a person's mind as though the person was actually at the photographed scene.

[Second Embodiment]

Next, a feeling-expressing-word processing device according to a second embodiment will be described. The feeling-expressing-word processing device according to the second embodiment represents an example where a signal of a still image is inputted as an input signal, the number of extended fingers in the still image is calculated as feeling information, and a feeling-expressing word corresponding to the feeling information is extracted and outputted.

First, a configuration of the feeling-expressing-word processing device according to the second embodiment will be described with reference to FIG. 6.

Figure 6:
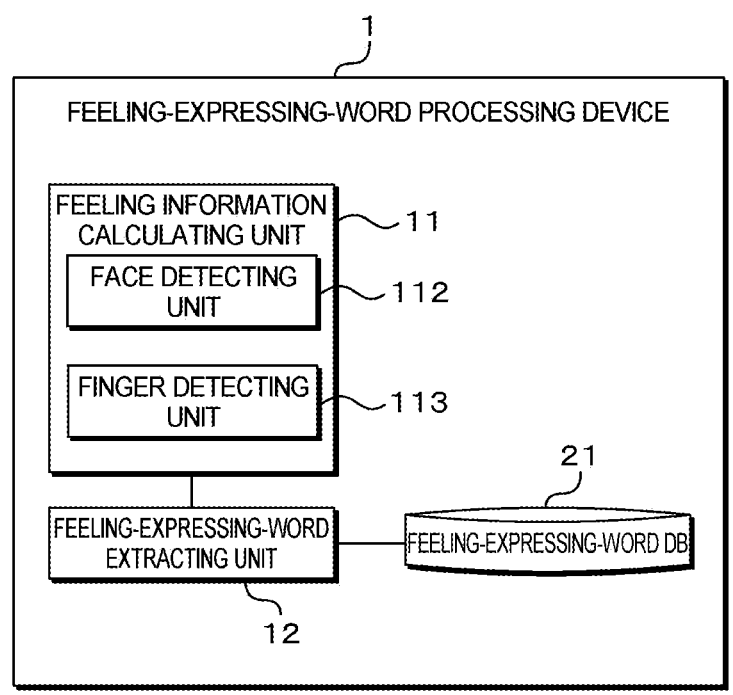
FIG. 6 is a block diagram illustrating a configuration of a feeling-expressing-word processing device according to a second embodiment.

As shown in FIG. 6, a feeling-expressing-word processing device 1 according to the second embodiment is similar to the feeling-expressing-word processing device according to the first embodiment (refer to FIG. 1) in that the feeling-expressing-word processing device 1 according to the second embodiment includes a feeling information calculating unit 11 and a feeling-expressing-word extracting unit 12. However, the feeling-expressing-word processing device 1 according to the second embodiment differs from the feeling-expressing-word processing device 1 according to the first embodiment in that the feeling information calculating unit 11 includes a face detecting unit 112 and a finger detecting unit 113. Hereinafter, differences from the first embodiment will be mainly described.

The face detecting unit 112 detects a face portrayed in a still image in a similar manner to the face detecting unit 111 according to the first embodiment. The face detecting unit 112 calculates a center coordinate, a width, and a height of a detected face region as face information.

The finger detecting unit 113 calculates feeling information by detecting fingers (a hand) portrayed in the still image and calculating the number of extended fingers. When calculating the number of extended fingers, the finger detecting unit 113 uses the face information calculated by the face detecting unit 112 to identify a hand region candidate and detects the number of extended fingers from the identified hand region. As a method for identifying a hand region candidate, for example, a method can be used which identifies a region with a largest area among flesh-colored regions near a face region as a hand region candidate. Alternatively, as the method for identifying a hand region candidate, a method described in Patent Publication JP-A-2003-346162 may be used or other methods may be used.

The feeling-expressing-word database 21 according to the second embodiment has a number of fingers table. A data configuration of the number of fingers table will be described with reference to FIG. 7. Examples of data items of the number of fingers table include a number of fingers item and a feeling-expressing-word item. The number of fingers item stores the number of fingers detected by the finger detecting unit 113. The feeling-expressing-word item stores feeling-expressing-words corresponding to the number of fingers.

Using the number of fingers table shown in FIG. 7, "guu (word describing a clenched hand; a fist)" which expresses a clenched hand is extracted as a feeling-expressing word when the number of extended fingers is "0", "piisu (Japanese transcription of "peace"; usually describes the peace sign)" which expresses a peace sign is extracted as a feeling-expressing word when the number of extended fingers is "2", and "pah (word describing an open hand)" which expresses an open hand is extracted as a feeling-expressing word when the number of extended fingers is "5".

Figure 8:
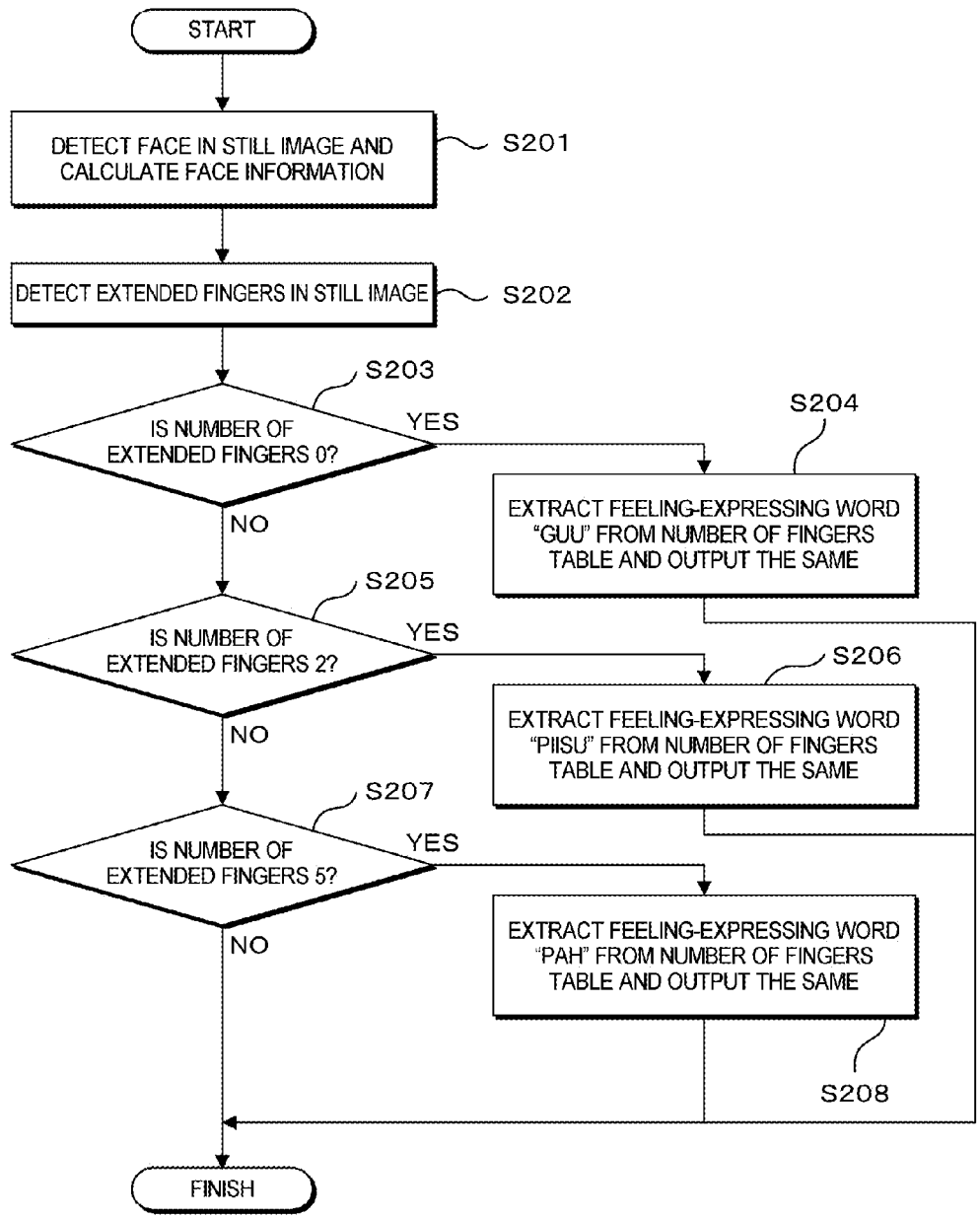
FIG. 8 is a flow chart for describing an operation of the feeling-expressing-word processing device according to the second embodiment.

Next, an operation of the feeling-expressing-word processing device according to the second embodiment will be described with reference to FIG. 8.

First, when a signal of a still image is inputted to the feeling-expressing-word processing device 1, the face detecting unit 112 of the feeling information calculating unit 11 detects faces portrayed in the still image and calculates face information (step S201).

Next, the finger detecting unit 113 of the feeling information calculating unit 11 detects the number of extended fingers portrayed in the still image using the face information calculated in step S201 (step S202).

Subsequently, the feeling-expressing-word extracting unit 12 judges whether or not the number of fingers detected in step S202 is 0 (step S203). When a "yes" judgment is made (YES in step S203), the feeling-expressing-word extracting unit 12 extracts and outputs the feeling-expressing word "guu" which is stored in association with "0" fingers from the number of fingers table of the feeling-expressing-word database 21 shown in FIG. 7 (step S204). Subsequently, the present operation is terminated.

On the other hand, when it is judged in step S203 that the number of fingers is not 0 (NO in step S203), the feeling-expressing-word extracting unit 12 judges whether or not the number of fingers is 2 (step S205). When a "yes" judgment is made (YES in step S205), the feeling-expressing-word extracting unit 12 extracts and outputs the feeling-expressing word "piisu" which is stored in association with "2" fingers from the number of fingers table (step S206). Subsequently, the present operation is terminated.

Meanwhile, when it is judged in step S205 that the number of fingers is not 2 (NO in step S205), the feeling-expressing-word extracting unit 12 judges whether or not the number of fingers is 5 (step S207). When a "yes" judgment is made (YES in step S207), the feeling-expressing-word extracting unit 12 extracts and outputs the feeling-expressing word "pah" which is stored in association with "5" fingers from the number of fingers table (step S208). Subsequently, the present operation is terminated.

On the other hand, when it is judged in step S207 that the number of fingers is not 5 (NO in step S207), the present operation is terminated without extracting a feeling-expressing word.

As described above, with the feeling-expressing-word processing device 1 according to the second embodiment, feeling-expressing words corresponding to the number of extended fingers in a still image can be extracted and outputted. Accordingly, a gesture made by the fingers of a photographed person can be clarified and emphasized. In other words, since a situation of a scene or a condition of an object present in the scene at the time of photography of a still image can be clarified and emphasized, an impression of the atmosphere of the scene or the object can be pictured in a person's mind as though the person was actually at the photographed scene.

Moreover, while the number of fingers is used as feeling information by the feeling-expressing-word processing device 1 according to the second embodiment, feeling information is not limited thereto. In addition to the number of fingers, the number of peoples' faces, a tilt of a face, a degree of a smile which are included in feeling information according to the first embodiment may be used in combination.

[Third Embodiment]

Next, a feeling-expressing-word processing device according to a third embodiment will be described. The feeling-expressing-word processing device according to the third embodiment represents an example where a signal of a moving image is inputted as an input signal, the number of dynamic bodies, a travel distance of a dynamic body, or transition information of a dynamic body in the moving image, or a luminance change of the moving image is calculated as feeling information, and a feeling-expressing word corresponding to the feeling information is extracted and outputted.

First, a configuration of the feeling-expressing-word processing device according to the third embodiment will be described with reference to FIG. 9.

Figure 9:
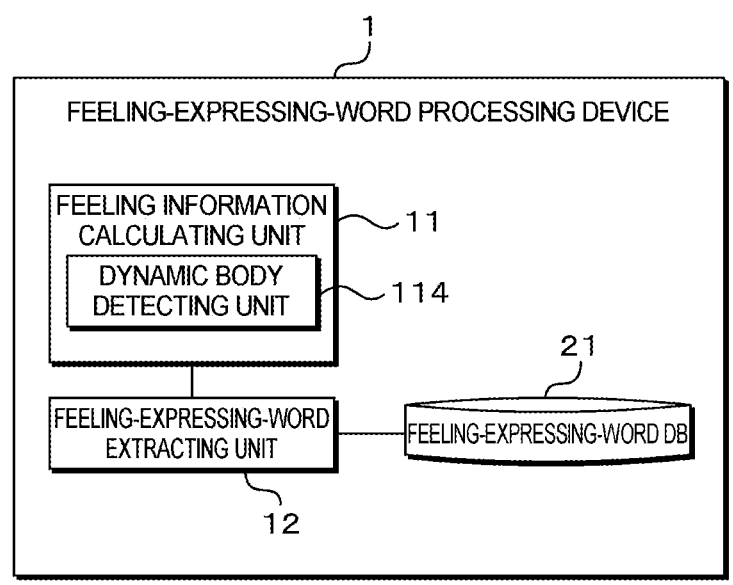
FIG. 9 is a block diagram illustrating a configuration of a feeling-expressing-word processing device according to a third embodiment.

As shown in FIG. 9, a feeling-expressing-word processing device 1 according to the third embodiment is similar to the feeling-expressing-word processing device 1 according to the first embodiment (refer to FIG. 1) in that the feeling-expressing-word processing device 1 according to the third embodiment includes a feeling information calculating unit 11 and a feeling-expressing-word extracting unit 12. However, the feeling-expressing-word processing device 1 according to the third embodiment differs from the feeling-expressing-word processing device 1 according to the first embodiment in that the feeling information calculating unit 11 includes a dynamic body detecting unit 114. Hereinafter, differences from the first embodiment will be mainly described.

The dynamic body detecting unit 114 detects dynamic bodies by analyzing an inputted moving image, and calculates feeling information by calculating the number of dynamic bodies, a travel distance of a dynamic body, transition information of a dynamic body, or luminance change.

As a method of detecting a dynamic body, for example, a method can be used which calculates a difference in values of pixels at same coordinates between a current frame image and a previous frame image (for example, a frame image that is one frame image prior to the current frame image) and detects a group of pixels whose differences exceed a threshold as a dynamic body.

A travel distance of a dynamic body can be obtained by, for example, calculating a difference between a position of a center of gravity of a dynamic body on a current frame image and a position of the center of gravity of the dynamic body shown in a previous frame image which corresponds to a vicinity of a position of the dynamic body portrayed in the current frame image.

Transition information of a dynamic body can be obtained by, for example, judging and quantifying a direction of a motion vector of a dynamic body and calculating a change over time of quantified values. For example, a direction quantifying table shown in FIG. 10 can be used when quantifying a direction of a motion vector of a dynamic body. In this case, for example, when a dynamic body is alternately repeating movements in negative and positive directions with respect to a horizontal axis, transition information is calculated as "0101".

A luminance change can be calculated by, for example, calculating a difference between an average of luminance values of the current frame image and an average of luminance values of a previous frame image or calculating a value which quantifies a difference between averages. For example, a value "a" which quantifies a difference between averages can be calculated according to Expressions (1) to (3) below, where "d" denotes a difference between averages and "T" denotes (>0) a threshold.

When $|d|<T$ $$a=0 \quad \text{Expression (1)}$$

When $d \geq T$ $$a=1 \quad \text{Expression (2)}$$

When $d \leq -T$ $$a=-1 \quad \text{Expression (3)}$$

The feeling-expressing-word database 21 according to the third embodiment has a number of dynamic bodies table, a dynamic body travel distance table, a dynamic body transition information table, and a luminance change table.

A data configuration of the number of dynamic bodies table will be described with reference to FIG. 11. Examples of data items of the number of dynamic bodies table include a number of dynamic bodies item and a feeling-expressing-word item. The number of dynamic bodies item stores the number of dynamic bodies detected by the dynamic body detecting unit 114. The feeling-expressing-word item stores feeling-expressing-words corresponding to the number of dynamic bodies. As the feeling-expressing words in the number of dynamic bodies table, words that more dramatically express a clamor at a scene are used in proportion to the number of dynamic bodies.

Using the number of dynamic bodies table shown in FIG. 11, "shiin" which expresses silence is extracted as a feeling-expressing word when the number of dynamic bodies is "0", "uro uro (word describing someone wandering about aimlessly; hanging around)" is extracted as a feeling-expressing word when the number of dynamic bodies is "1", and "gocha gocha" which expresses a clamor is extracted as a feeling-expressing word when the number of dynamic bodies is "5" or more.

A data configuration of the dynamic body travel distance table will be described with reference to FIG. 12. Examples of data items of the dynamic body travel distance table include a dynamic body travel distance item and a feeling-expressing-word item. The dynamic body travel distance item stores travel distances of dynamic bodies as calculated by the dynamic body detecting unit 114. A travel distance of a dynamic body is expressed using a value normalized so as to range from "0.0" to "1.0". The feeling-expressing-word item stores feeling-expressing-words corresponding to the travel distance of a dynamic body. As the feeling-expressing words in the dynamic body travel distance table, words that more dramatically express a movement speed are used in proportion to the magnitude of a travel distances of a dynamic body.

Using the dynamic body travel distance table shown in FIG. 12, "yoro yoro (word describing something unsteady on its feet and unstable; tottering)" is extracted as a feeling-expressing word when the travel distance of a dynamic body is equal to or more than "0.0" and less than "0.1", "fura fura (word describing tottering or staggering)" is extracted as a feeling-expressing word when the travel distance of the dynamic body is equal to or more than "0.1" and less than "0.2", and "dasshu (Japanese transcription of dash)" is extracted as a feeling-expressing word when the travel distance of the dynamic body is equal to or more than "0.9" and equal to or less than "1.0".

A data configuration of the dynamic body transition information table will be described with reference to FIG. 13. Examples of data items of the dynamic body transition information table include a dynamic body transition information item and a feeling-expressing-word item. The dynamic body transition information item stores dynamic body transition information calculated by the dynamic body detecting unit 114. The feeling-expressing-word item stores feeling-expressing-words corresponding to the dynamic body transition information. As the feeling-expressing words in the dynamic body transition information table, words are used which express a repetitive movement corresponding to a periodicity that is recognized based on dynamic body transition information.

Using the dynamic body transition information table shown in FIG. 13, "uro uro" is extracted as a feeling-expressing word when the dynamic body transition information is "0101" or "1010", "suta suta (word describing walking hurriedly)" is extracted as a feeling-expressing word when the dynamic body transition information is "0000" or "1111", and "pyon pyon (word describing hopping or skipping agilely)" is extracted as a feeling-expressing word when the dynamic body transition information is "2323" or "3232".

A data configuration of the luminance change table will be described with reference to FIG. 14. Examples of data items of the luminance change table include a luminance change item and a feeling-expressing-word item. The luminance change item stores a luminance change calculated by the dynamic body detecting unit 114. The luminance changes shown in FIG. 14 are expressed by quantified values calculated according to Expressions (1) to (3) above. The feeling-expressing-word item stores feeling-expressing-words corresponding to luminance change. As the feeling-expressing words in the luminance change table, words expressing a situation where lighting is turned on are used when luminance changes to a higher value and words expressing a situation where lighting is turned off are used when luminance changes to a lower value.

Using the luminance change table shown in FIG. 14, "hyun (word roughly equivalent to zing)" which expresses a light being turned off is extracted as a feeling-expressing word when the luminance change is "−1", and "pika (word roughly equivalent to flash)" which expresses a light being turned on is extracted as a feeling-expressing word when the luminance change is "1".

Moreover, the number of dynamic bodies, a travel distance of a dynamic body, dynamic body transition information, and luminance change may be expressed using values other than those described above. In addition, as feeling information, any one of the number of dynamic bodies, a travel distance of a dynamic body, dynamic body transition information, and luminance change may be used, or a plurality may be used in combination. Furthermore, in addition to the feeling information used in the third embodiment, any one of or a plurality of types of feeling information used in the first and second embodiments may be used in combination with the feeling information used in the third embodiment.

Figure 15:
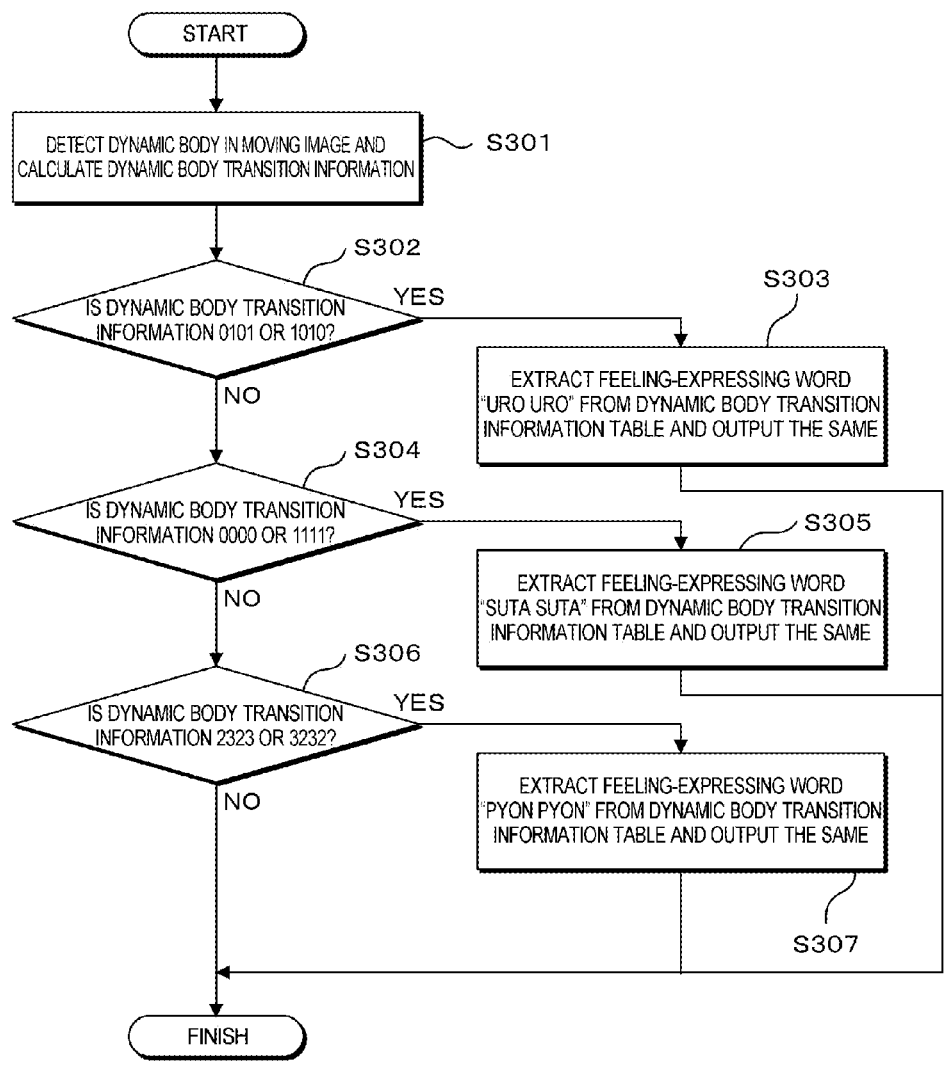
FIG. 15 is a flow chart for describing an operation of the feeling-expressing-word processing device according to the third embodiment.

Next, an operation of the feeling-expressing-word processing device according to the third embodiment will be described with reference to FIG. 15. For this operation example, a case where dynamic body transition information is used as feeling information will be described.

First, when a signal of a moving image is inputted to the feeling-expressing-word processing device 1, the dynamic body detecting unit 114 of the feeling information calculating unit 11 detects a dynamic body portrayed in the moving image and calculates dynamic body transition information (step S301).

Subsequently, the feeling-expressing-word extracting unit 12 judges whether or not the dynamic body transition information calculated in step S301 is "0101" or "1010" (step S302). When a "yes" judgment is made (YES in step S302), the feeling-expressing-word extracting unit 12 extracts and outputs the feeling-expressing word "uro uro" which is stored in association with dynamic body transition information "0101" and "1010" from the dynamic body transition information table of the feeling-expressing-word database 21 shown in FIG. 13 (step S303). The present operation is then terminated.

On the other hand, when it is judged in step S302 that the dynamic body transition information is neither "0101" nor "1010" (NO in step S302), the feeling-expressing-word extracting unit 12 judges whether or not the dynamic body transition information is "0000" or "1111" (step S304). When a "yes" judgment is made (YES in step S304), the feeling-expressing-word extracting unit 12 extracts and outputs the feeling-expressing word "suta suta" which is stored in association with dynamic body transition information "0000" and "1111" from the dynamic body transition information table (step S305). The present operation is then terminated.

Meanwhile, when it is judged in step S304 that the dynamic body transition information is neither "0000" nor "1111" (NO in step S304), the feeling-expressing-word extracting unit 12 judges whether or not the dynamic body transition information is "2323" or "3232" (step S306). When a "yes" judgment is made (YES in step S306), the feeling-expressing-word extracting unit 12 extracts and outputs the feeling-expressing word "pyon pyon" which is stored in association with dynamic body transition information "2323" and "3232" from the dynamic body transition information table (step S307). The present operation is then terminated.

On the other hand, when it is judged in step S306 that the dynamic body transition information is neither "2323" nor "3232" (NO in step S306), the present operation is terminated without extracting a feeling-expressing word.

As described above, with the feeling-expressing-word processing device 1 according to the third embodiment, feeling-expressing words corresponding to the number of dynamic bodies, a travel distance of a dynamic body, or transition information of a dynamic body in a moving image as well as a luminance change of the moving image can be extracted and outputted. Accordingly, since a temporal change of a scene or a movement of an object present in the scene at the time of photography of a moving image can be clarified and emphasized, an impression of the atmosphere of the scene or the object can be pictured in a person's mind as though the person was actually at the photographed scene. Furthermore, by viewing a feeling-expressing word, the temporal change of a scene of photography or the movement of an object present in the scene can be perceived without having to view an entire moving image.

[Fourth Embodiment]

Next, a feeling-expressing-word processing device according to a fourth embodiment will be described. The feeling-expressing-word processing device according to the fourth embodiment represents an example where a feeling-expressing-word outputted from the feeling-expressing-word extracting unit 12 of the feeling-expressing-word processing device 1 according to the first embodiment is superimposed on an externally inputted still image and displayed by a display device 5.

Figure 16:
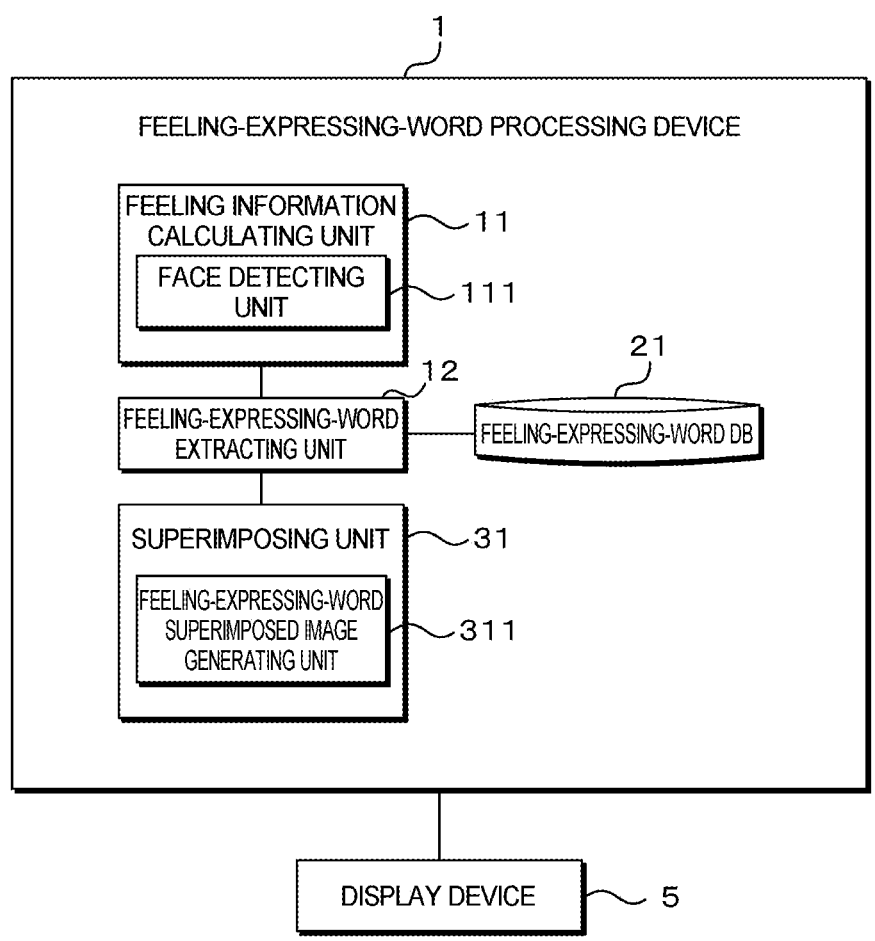
FIG. 16 is a block diagram illustrating a configuration of a feeling-expressing-word processing device according to a fourth embodiment.

A configuration of the feeling-expressing-word processing device according to the fourth embodiment will be described with reference to FIG. 16. As shown in FIG. 16, a feeling-expressing-word processing device 1 according to the fourth embodiment differs from the feeling-expressing-word processing device 1 according to the first embodiment (refer to FIG. 1) in that the feeling-expressing-word processing device 1 according to the fourth embodiment includes a superimposing unit 31 in addition to the feeling information calculating unit 11 and the feeling-expressing-word extracting unit 12. Hereinafter, differences from the first embodiment will be mainly described.

The superimposing unit 31 includes a feeling-expressing-word superimposed image generating unit 311. The feeling-expressing-word superimposed image generating unit 311 uses an inputted still image and a feeling-expressing word outputted by the feeling-expressing-word extracting unit 12 to generate a feeling-expressing-word superimposed image in which the feeling-expressing word is superimposed on the still image. The feeling-expressing-word superimposed image generating unit 311 generates a feeling-expressing-word superimposed image by superimposing a feeling-expressing word based on font information determined in advance at a predetermined position of a still image. For example, font information includes a font (character shape), a font size (character size), and character color.

The superimposing unit 31 causes the display device 5 to display the feeling-expressing-word superimposed image generated by the feeling-expressing-word superimposed image generating unit 311.

Figure 17:
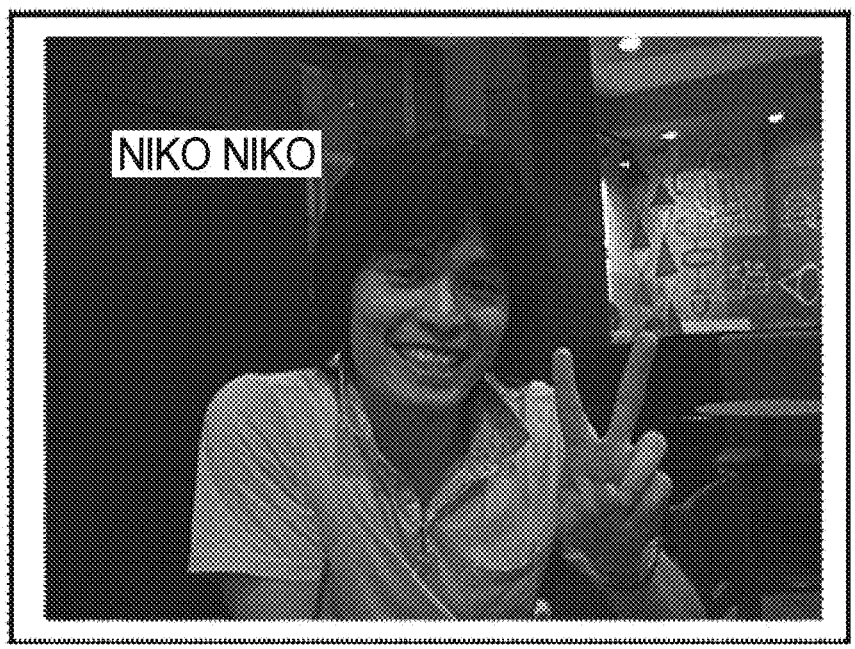
FIG. 17 is a diagram illustrating a feeling-expressing-word superimposed image displayed on a display device.

FIG. 17 shows an example of a feeling-expressing-word superimposed image displayed on the display device 5. A feeling-expressing word "niko niko" that has been extracted according to the degree of a smile is superimposed on the still image shown in FIG. 17.

As described above, with the feeling-expressing-word processing device 1 according to the fourth embodiment, a feeling-expressing word corresponding to the number of faces, a tilt of a face, or a degree of a smile in a still image can be extracted and displayed superimposed on the still image. Accordingly, since a situation of a scene or a condition of an object present in the scene at the time of photography of a still image can be clarified and emphasized, an impression of the atmosphere of the scene or the object can be pictured in a person's mind as though the person was actually at the photographed scene.

Moreover, while a case where a feeling-expressing-word outputted by the feeling-expressing-word extracting unit 12 according to the first embodiment is superimposed on a still image has been described in the fourth embodiment, the fourth embodiment can be similarly applied to a case where a feeling-expressing-word outputted by the feeling-expressing-word extracting unit 12 according to the second embodiment is superimposed on a still image or to a case where a feeling-expressing-word outputted by the feeling-expressing-word extracting unit 12 according to the third embodiment is superimposed on a moving image.

[Fifth Embodiment]

Next, a feeling-expressing-word processing device according to a fifth embodiment will be described. The feeling-expressing-word processing device according to the fifth embodiment represents an example where, in addition to contents of the fourth embodiment described above, a superimposing position, font information, and the like when superimposing a feeling-expressing word are determined based on face information calculated by the face detecting unit 112.

Figure 18:
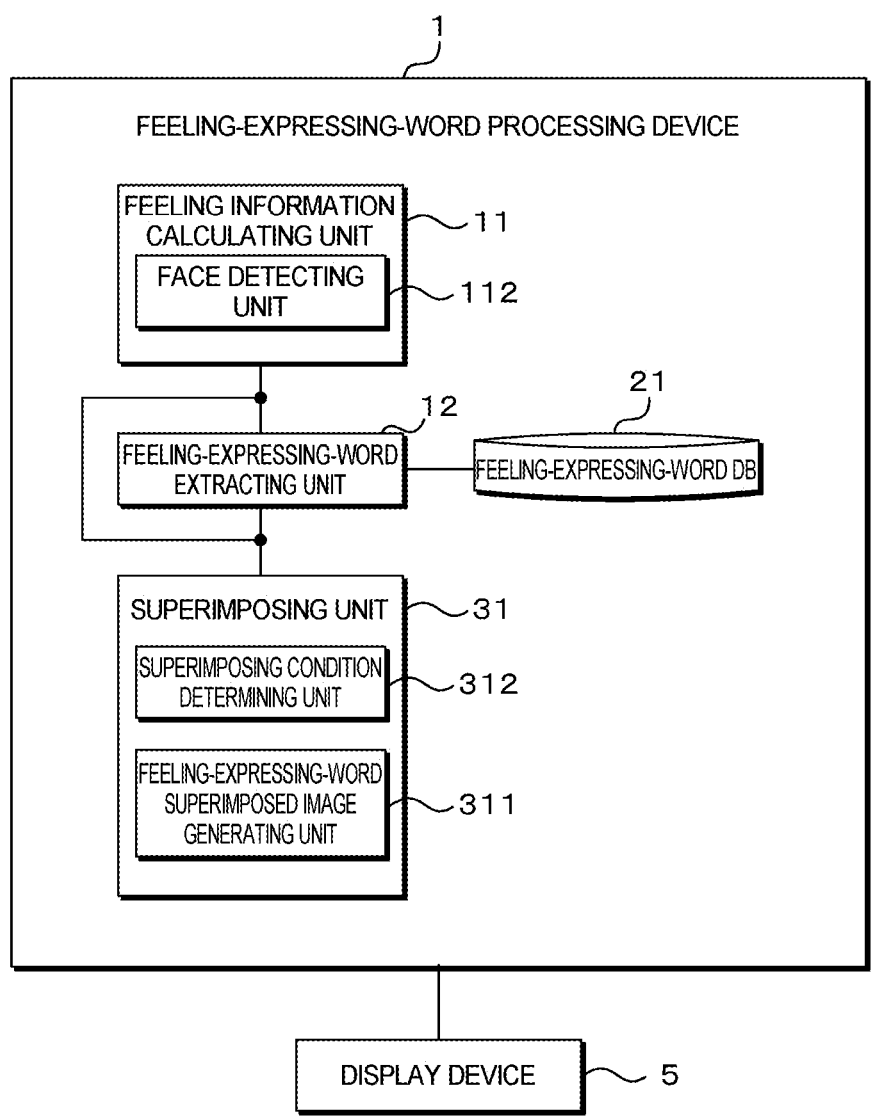
FIG. 18 is a block diagram illustrating a configuration of a feeling-expressing-word processing device according to a fifth embodiment.

A configuration of the feeling-expressing-word processing device according to the fifth embodiment will be described with reference to FIG. 18. As shown in FIG. 18, a feeling-expressing-word processing device 1 according to the fifth embodiment differs from the feeling-expressing-word processing device 1 according to the fourth embodiment (refer to FIG. 16) in that the superimposing unit 31 further includes a superimposing condition determining unit 312 and that the face detecting unit 112 according to the second embodiment is included in place of the face detecting unit 111. Hereinafter, differences from the fourth embodiment will be mainly described.

The superimposing condition determining unit 312 determines a superimposing position of a feeling-expressing word according to face information (a center coordinate of a face region, a width of the face region, a height of the face region) calculated by the face detecting unit 112. For example, a position where a feeling-expressing word is superimposed is favorably a position that does not overlap with a face region or is a position that is near the face region. Accordingly, since the feeling-expressing word is prevented from overlapping with the face region which is likely to attract attention, visibility of the image can be maintained. In addition, by superimposing the feeling-expressing word near the face region which is likely to attract attention, an impression of the atmosphere of a scene or an object present in the scene can be pictured in a person's mind as though the person was actually at the photographed scene.

The superimposing condition determining unit 312 analyzes an inputted still image and determines font information including a font, a font size, and a character color of the feeling-expressing word to be superimposed. Specifically, for example, a font can be determined according to a photographed scene by analyzing the still image. In addition, a size of a region of an object in the still image can be analyzed, whereby a font size can be increased when the region of the object is large and reduced when the region of the object is small. Furthermore, a complementary color of a color that has a highest frequency of appearance in a region on which the feeling-expressing word is to be superimposed can be selected as the character color. Accordingly, visibility of the image can be maintained.

The feeling-expressing-word superimposed image generating unit 311 superimposes the feeling-expressing word at a position determined by the superimposing condition determining unit 312 based on font information determined by the superimposing condition determining unit 312 to generate a feeling-expressing-word superimposed image.

As described above, with the feeling-expressing-word processing device 1 according to the fifth embodiment, feeling-expressing words corresponding to the number of faces, a tilt of a face, and a degree of a smile in a still image can be extracted and displayed superimposed near a face region so as not to overlap with the face region. Accordingly, since a situation of a scene or a condition of an object present in the scene at the time of photography of a still image can be further clarified and emphasized, an impression of the atmosphere of the scene or the object can be pictured in a person's mind as though the person was actually at the photographed scene.

[Sixth Embodiment]

Next, a feeling-expressing-word processing device according to a sixth embodiment will be described. The feeling-expressing-word processing device according to the sixth embodiment represents an example where, in addition to contents of the fifth embodiment described above, a superimposing position, font information, and the like when superimposing a feeling-expressing word are determined based on face information calculated by the face detecting unit 112 and on a hand region identified by the finger detecting unit 113.

Figure 19:
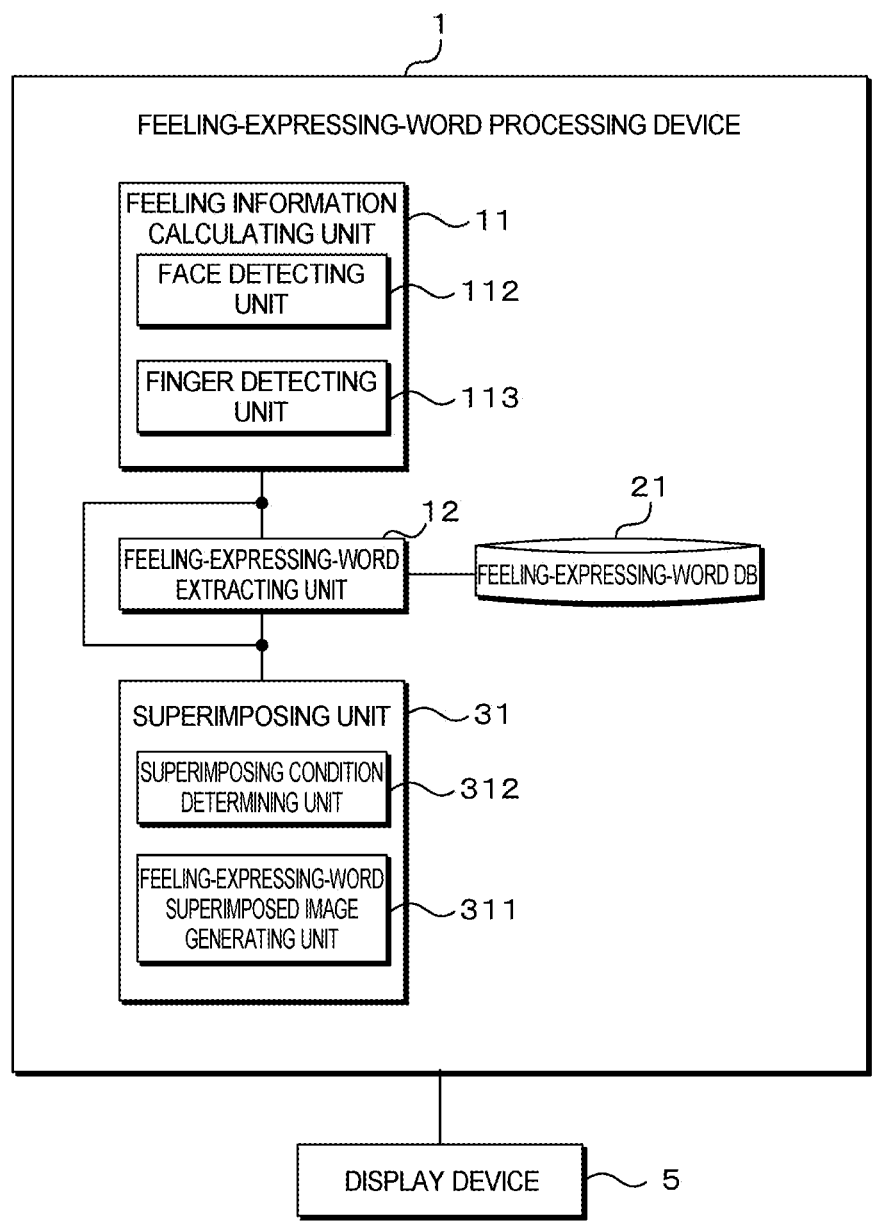
FIG. 19 is a block diagram illustrating a configuration of a feeling-expressing-word processing device according to a sixth embodiment.

A configuration of the feeling-expressing-word processing device according to the sixth embodiment will be described with reference to FIG. 19. As shown in FIG. 19, a feeling-expressing-word processing device 1 according to the sixth embodiment differs from the feeling-expressing-word processing device 1 according to the fifth embodiment (refer to FIG. 18) in that the feeling-expressing-word processing device 1 according to the sixth embodiment further includes the finger detecting unit 113 according to the second embodiment. Hereinafter, differences from the fifth embodiment will be mainly described.

The superimposing condition determining unit 312 determines a superimposing position of a feeling-expressing word according to face information calculated by the face detecting unit 112 and a hand region identified by the finger detecting unit 113. For example, in addition to a position that does not overlap with a face region or a position near the face region which have been described in the fifth embodiment above, a position where a feeling-expressing word is superimposed is favorably a position that does not overlap with a hand region or is a position that is near the hand region.

As described above, with the feeling-expressing-word processing device 1 according to the sixth embodiment, feeling-expressing words corresponding to the number of faces, a tilt of a face, a degree of a smile, or the number of extended fingers in a still image can be extracted and displayed superimposed near a face region or a hand region so as not to overlap with the face region or the hand region. Accordingly, since a situation of a scene or a condition of an object present in the scene at the time of photography of a still image can be further clarified and emphasized, an impression of the atmosphere of the scene or the object can be pictured in a person's mind as though the person was actually at the photographed scene.

[Seventh Embodiment]

Next, a feeling-expressing-word processing device according to a seventh embodiment will be described. The feeling-expressing-word processing device according to the seventh embodiment represents an example where, in addition to contents of the sixth embodiment described above, an externally inputted still image is converted into a sketchy image, and a feeling-expressing word is superimposed on the converted sketchy image and displayed on the display device 5.

Figure 20:
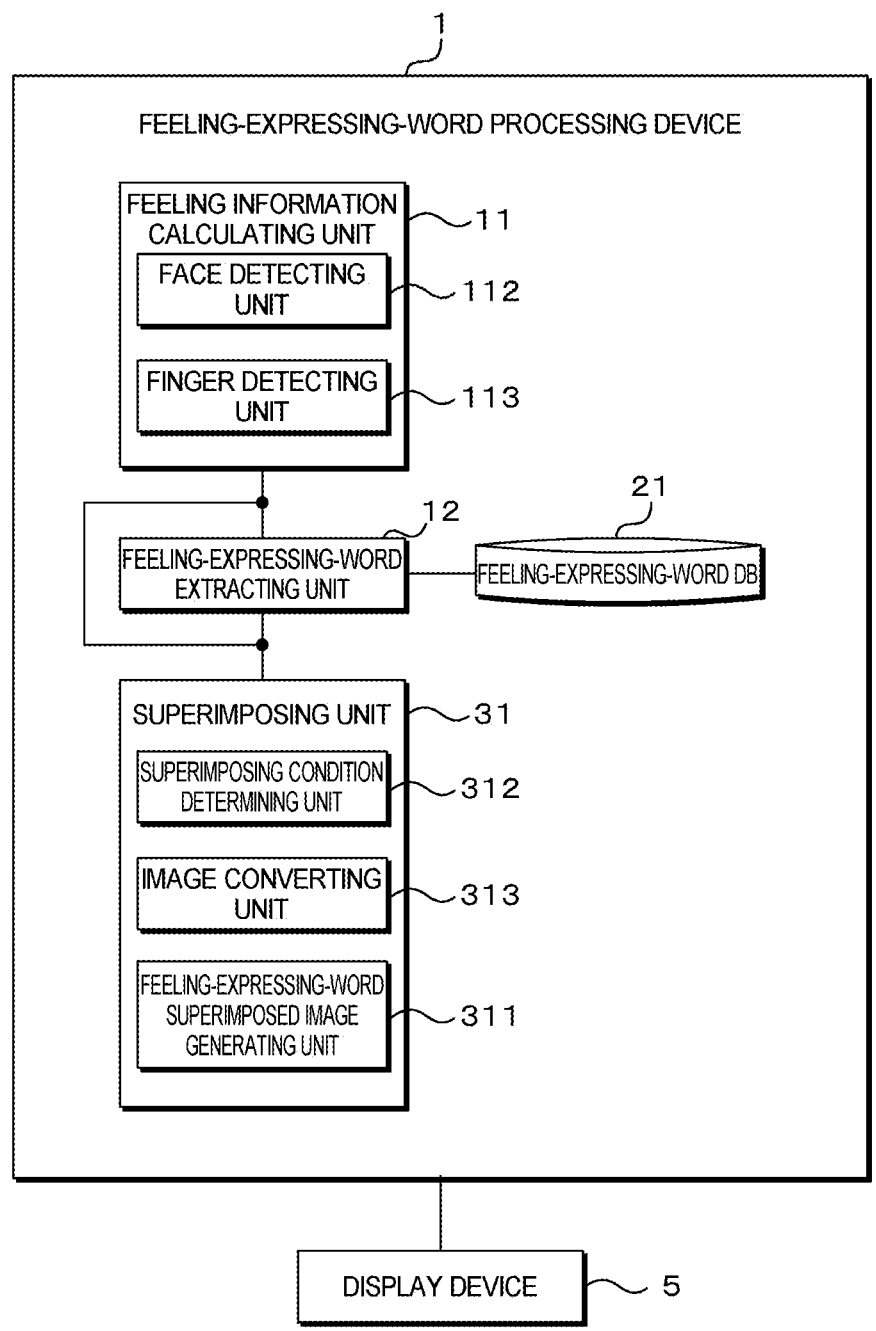
FIG. 20 is a block diagram illustrating a configuration of a feeling-expressing-word processing device according to a seventh embodiment.

A configuration of the feeling-expressing-word processing device according to the seventh embodiment will be described with reference to FIG. 20. As shown in FIG. 20, a feeling-expressing-word processing device 1 according to the seventh embodiment differs from the feeling-expressing-word processing device 1 according to the sixth embodiment (refer to FIG. 19) in that the feeling-expressing-word processing device 1 according to the seventh embodiment further includes an image converting unit 313. Hereinafter, differences from the sixth embodiment will be mainly described.

The image converting unit 313 converts an inputted still image into a sketchy image. As a method of conversion into a sketchy image, for example, a technique described in WO2006/106750 can be used. Since fine shading can be omitted and the number of colors can be reduced in a still image by converting the still image into a sketchy image, edges can be emphasized.

The feeling-expressing-word superimposed image generating unit 311 superimposes a feeling-expressing word on the sketchy image converted by the image converting unit 313 to generate a feeling-expressing-word superimposed image. In doing so, the feeling-expressing word is superimposed at a position determined by the superimposing condition determining unit 312 using a font, a font size, and a character color determined by the superimposing condition determining unit 312.

Figure 21:
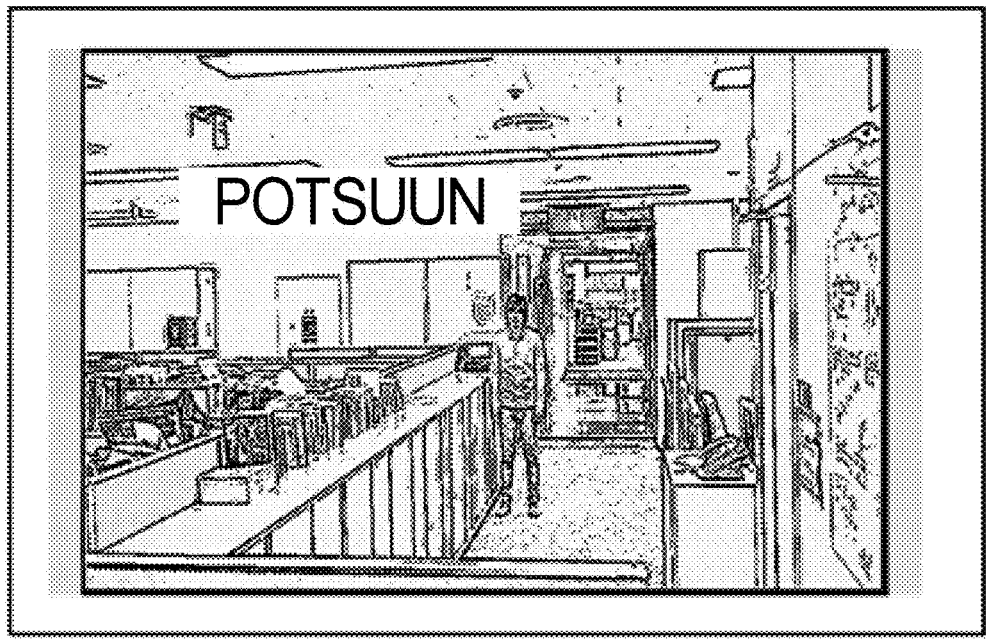
FIG. 21 is a diagram illustrating a feeling-expressing-word superimposed image displayed on a display device.

FIG. 21 shows an example of a feeling-expressing-word superimposed image displayed on the display device 5. The still image shown in FIG. 21 is a still image photographed inside an office which has been converted into a sketchy image, and a feeling-expressing word "potsuun (word describing a state of loneliness, solitude)" has been superimposed.

As described above, with the feeling-expressing-word processing device 1 according to the seventh embodiment, an inputted still image can be converted into a sketchy image and a feeling-expressing word can be superimposed on the converted sketchy image. Accordingly, since primary shading, colors, and edges in the still image can be accentuated, a subject can be clarified and emphasized. In other words, since a situation of a scene or a condition of an object present in the scene at the time of photography of a still image can be further clarified and emphasized by superimposing a feeling-expressing word on a sketchy image, an impression of the atmosphere of the scene or the object can be pictured in a person's mind as though the person was actually at the photographed scene.

[Eighth Embodiment]

Next, a feeling-expressing-word processing device according to an eighth embodiment will be described. The feeling-expressing-word processing device according to the eighth embodiment represents an example where a feeling-expressing-word outputted from the feeling-expressing-word extracting unit 12 of the feeling-expressing-word processing device 1 according to the third embodiment is superimposed on an externally inputted moving image and displayed by a display device 5 and, in addition, a superimposing position, font information, and the like when superimposing the feeling-expressing word are determined based on variation information which indicates a movement of an object or the like.

Figure 22:
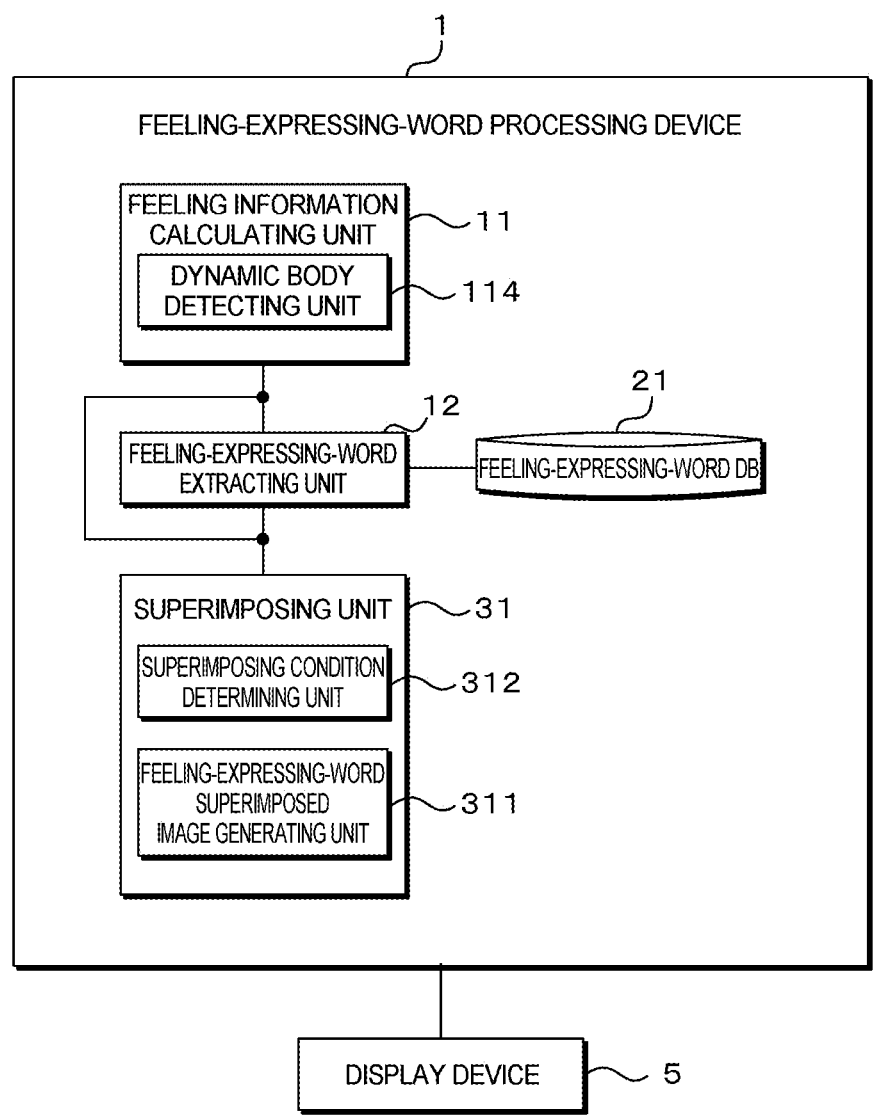
FIG. 22 is a block diagram illustrating a configuration of a feeling-expressing-word processing device according to an eighth embodiment.

A configuration of the feeling-expressing-word processing device according to the eighth embodiment will be described with reference to FIG. 22. As shown in FIG. 22, a feeling-expressing-word processing device 1 according to the eighth embodiment differs from the feeling-expressing-word processing device 1 according to the third embodiment (refer to FIG. 9) in that the feeling-expressing-word processing device 1 according to the eighth embodiment includes the superimposing unit 31 in addition to the feeling information calculating unit 11 and the feeling-expressing-word extracting unit 12. Hereinafter, differences from the third embodiment will be mainly described.

The superimposing unit 31 includes the superimposing condition determining unit 312 and the feeling-expressing-word superimposed image generating unit 311.

The superimposing condition determining unit 312 calculates variation information based on a dynamic body detected by the dynamic body detecting unit 114 and determines a superimposing position of a feeling-expressing word according to the variation information. For example, information indicating a movement of the dynamic body corresponds to variation information. Specifically, for example, when a moving image shows a pedestrian, a superimposing position is determined in accordance with variation information indicating a movement of the pedestrian. Accordingly, a feeling-expressing word "suta suta" which expresses a walking motion can be superimposed on the moving image in accordance with the movement of the pedestrian.

Moreover, variation information is not limited to information indicating the movement of a dynamic body. For example, information indicating a region with a small change in color, a small change in luminance, or a small edge change which is obtained by analyzing a moving image can be calculated as variation information. In this case, for example, when a moving image shows a street scene, a region of a building wall or the sky can be detected and a feeling-expressing word can be superimposed on the detected region.

The superimposing condition determining unit 312 analyzes an inputted moving image and determines font information including a font, a font size, and a character color of the feeling-expressing word to be superimposed. Specifically, for example, a font can be determined according to a photographed scene by analyzing the moving image. In addition, a size of a region of an object in the moving image can be analyzed, whereby a font size can be increased when the region of the object is large and reduced when the region of the object is small. Furthermore, a complementary color of a color that has a highest frequency of appearance in a region on which the feeling-expressing word is to be superimposed can be selected as the character color. Accordingly, visibility of the image can be maintained.

The feeling-expressing-word superimposed image generating unit 311 uses an inputted moving image and a feeling-expressing word outputted by the feeling-expressing-word extracting unit 12 to generate a feeling-expressing-word superimposed image in which the feeling-expressing word is superimposed on the moving image. The feeling-expressing-word superimposed image generating unit 311 superimposes the feeling-expressing word at the position determined by the superimposing condition determining unit 312 based on font information determined by the superimposing condition determining unit 312 to generate the feeling-expressing-word superimposed image.

The superimposing unit 31 causes the display device 5 to display the feeling-expressing-word superimposed image generated by the feeling-expressing-word superimposed image generating unit 311.

As described above, with the feeling-expressing-word processing device 1 according to the eighth embodiment, feeling-expressing words corresponding to the number of dynamic bodies, a travel distance of a dynamic body, or transition information of a dynamic body in a moving image as well as a luminance change of the moving image can be extracted and superimposed in accordance with a movement or a change in the moving image. Accordingly, since a temporal change of a scene or a movement of an object present in the scene at the time of photography of a moving image can be further clarified and emphasized, an impression of the atmosphere of the scene or the object can be pictured in a person's mind as though the person was actually at the photographed scene.

Moreover, the respective embodiments described above are for illustrative purposes only and are not intended to preclude the application of various modifications and techniques not clearly specified in the respective embodiments. In other words, various modifications can be made to the present invention without departing from the spirit and scope thereof. For example, the respective embodiments described above can be suitably combined with each other.

Although a part of or all of the respective embodiments above can be described as in the following Appendices, the following Appendices are in no way intended to limit the present invention.

(Appendix 1) A feeling-expressing-word processing device comprising: a feeling information calculating unit for analyzing a photographed image, and calculating feeling information which indicates a situation of a scene portrayed in the photographed image, a condition of an object present in the scene, a temporal change in the scene, or a movement of the object; a feeling-expressing-word extracting unit for extracting, from among feeling-expressing words which express feelings and are stored in advance in association with the feeling information, a feeling-expressing word which corresponds to the feeling information calculated by the feeling information calculating unit; and a superimposing unit for superimposing the feeling-expressing word extracted by the feeling-expressing-word extracting unit on the image.

(Appendix 2) The feeling-expressing-word processing device according to Appendix 1, wherein the feeling information calculating unit calculates the feeling information which at least includes any of the number of faces, a tilt of a face, a degree of a smile, the number of fingers, the number of dynamic bodies which are regions with significant movement, a travel distance of the dynamic body, transition information of the dynamic body, and a change in luminance of the image.

(Appendix 3) The feeling-expressing-word processing device according to Appendix 1 or 2, wherein the superimposing unit includes: a superimposing condition determining unit which determines at least any of a superimposing position of the feeling-expressing-word to be superimposed on the image, a character shape, a character size, and a character color; and a superimposed image generating unit which uses the position, the shape, the size, or the color determined by the superimposing condition determining unit to superimpose the feeling-expressing-word on the image and generate a feeling-expressing-word superimposed image.

(Appendix 4) The feeling-expressing-word processing device according to Appendix 3, wherein the superimposing condition determining unit determines a superimposing position of the feeling-expressing-word based on at least any of information that indicates a movement of the dynamic body and information that indicates a region with a small color change, a small luminance change, or a small edge change in the image.

(Appendix 5) The feeling-expressing-word processing device according to Appendix 3 or 4, wherein the superimposing condition determining unit determines a superimposing position of the feeling-expressing-word based on at least any of a position of a face and a position of a hand in the image.

(Appendix 6) The feeling-expressing-word processing device according to any one of Appendices 3 to 5, wherein the superimposing unit further includes an image converting unit which converts the image into a sketchy image, and the superimposed image generating unit superimposes the feeling-expressing-word on the sketchy image converted by the image converting unit.

(Appendix 7) The feeling-expressing-word processing device according to any one of Appendices 1 to 6, wherein the feeling-expressing-word is at least an onomatopoeic word or a mimetic word.

(Appendix 8) A feeling-expressing-word processing method comprising: a feeling information calculating step of analyzing a photographed image, and calculating feeling information which indicates a situation of a scene portrayed in the photographed image, a condition of an object present in the scene, a temporal change in the scene, or a movement of the object;
 a feeling-expressing-word extracting step of extracting, from among feeling-expressing words which express feelings and are stored in advance in association with the feeling information, a feeling-expressing word which corresponds to the feeling information calculated by the feeling information calculating unit; and a superimposing step of superimposing the feeling-expressing word extracted by the feeling-expressing-word extracting unit on the image.

(Appendix 9) A feeling-expressing-word processing program which causes a computer to execute the respective steps according to Appendix 8.

The present application claims priority to Japanese Patent Application No. 2010-261229, filed on Nov. 24, 2010, the entirety of which is incorporated herein by reference.

The feeling-expressing-word processing device, the feeling-expressing-word processing method, and the feeling-expressing-word processing program according to the present invention are suitable for enabling an impression of the atmosphere of a scene or an object present in the scene at the time of photography to be pictured in a person's mind as though the person was actually at the photographed scene.

1 feeling-expressing-word processing device
5 display device
11 feeling information calculating unit
12 feeling-expressing-word extracting unit
21 feeling-expressing-word database
31 superimposing unit
111, 112 face detecting unit 113 finger detecting unit
114 dynamic body detecting unit
311 feeling-expressing-word superimposed image generating unit
312 superimposing condition determining unit
313 image converting unit

We claim:

1. A feeling-expressing-word processing device comprising:
   one or more processors;
   a feeling information calculating unit configured to detect at least one dynamic body which are regions of significant movement appearing in a current photographed image, calculate a travel distance and a movement direction of the dynamic body based on a difference between the center of gravity of the dynamic body and the center of gravity of a dynamic body appearing in a previously-photographed image, and calculate feeling information which includes one or more of a number of faces, a tilt of a face, the number of dynamic bodies, transition information of the dynamic body, and a change in luminance of the current image as the feeling information which indicates a situation of a scene portrayed in the current photographed image, a condition of an object present in the scene, a temporal change in the scene, or a movement of the object based on the travel distance and the movement direction of the dynamic body;
   a feeling-expressing-word extracting unit configured to extract, from among feeling-expressing words which express feelings stored in advance in association with the feeling information, a feeling-expressing word which corresponds to the feeling information calculated by the feeling information calculating unit; and
   a superimposing unit configured to superimpose the feeling-expressing word extracted by the feeling-expressing-word extracting unit on the current image,
   wherein the one or more processors cause at least one of the feeling information calculating unit to perform the detecting, the feeling-expressing-word extracting unit to perform the extracting, and the superimposing unit to perform the superimposing,
   wherein as the feeling-expressing-words corresponding to the number of faces, words that express a degree of excitement at a scene are used in proportion to the number of faces,
   as the feeling-expressing words corresponding to the tilt of the face, words that express an increased degree of intimacy are used corresponding to an increase in the tilts of two faces side-by-side in directions approaching each other,
   as the feeling-expressing-words corresponding to the number of dynamic bodies, words that express a degree of clamor at a scene are used in proportion to the number of dynamic bodies,
   as the feeling-expressing-words corresponding to the dynamic body transition information, words are used which express a repetitive movement corresponding to a periodicity that is recognized based on the dynamic body transition information, and
   as the feeling-expressing-words corresponding to the luminance change, words expressing a situation where lighting is turned on are used when luminance changes to a first value and words expressing a situation where lighting is turned off are used when luminance changes to a second value that is lower than the first value.

2. The feeling-expressing-word processing device according to claim 1, wherein the superimposing unit includes:
   a superimposing condition determining unit configured to determine one or more of a superimposing position of the feeling-expressing-word to be superimposed on the image, a character shape, a character size, and a character color, and
   a superimposed image generating unit which uses the position, the shape, the size, or the color determined by the superimposing condition determining unit to superimpose the feeling-expressing-word on the image and generate a feeling-expressing-word superimposed image.

3. The feeling-expressing-word processing device according to claim 2, wherein the superimposing condition determining unit determines a superimposing position of the feeling-expressing-word based on one or more of information that indicates a movement of the dynamic body, and information that indicates a region with a small color change, a small luminance change, or a small edge change in the current image.

4. The feeling-expressing-word processing device according to claim 2, wherein the superimposing condition determining unit determines a superimposing position of the feeling-expressing-word based on one or more of a position of a face and a position of a hand in the current image.

5. The feeling-expressing-word processing device according to claim 2, wherein the superimposing unit further includes an image converting unit which converts the image into a sketch image that simulates having been sketched by a human artist, and
   the superimposed image generating unit superimposes the feeling-expressing-word on the sketch image converted by the image converting unit.

6. The feeling-expressing-word processing device according to claim 1, wherein the feeling-expressing-word is one or more of an onomatopoeic word and a mimetic word.

7. A feeling-expressing-word processing method comprising:
   detecting, using one or more processors, at least one dynamic body which are regions of significant movement appearing in a current photographed image, calculating a travel distance and a movement direction of the dynamic body based on a difference between the center of gravity of the dynamic body and the center of gravity of a dynamic body appearing in a previously-photographed image, and calculating feeling information which includes one or more of a number of faces, a tilt of a face, the number of dynamic bodies, transition information of the dynamic body, and a change in luminance of the current image as the feeling information which indicates a situation of a scene portrayed in the current photographed image, a condition of an object present in the scene, a temporal change in the scene, or a movement of the object based on the travel distance and the movement direction of the dynamic body;
   extracting, using the one or more processors, from among feeling-expressing words which express feelings and are stored in advance in association with the feeling information, a feeling-expressing word which corresponds to the calculated feeling information; and
   superimposing, using the one or more processors, the extracted feeling-expressing word on the current image,
   wherein as the feeling-expressing-words corresponding to the number of faces, words that express a degree of excitement at a scene are used in proportion to the number of faces,
   as the feeling-expressing words corresponding to the tilt of the face, words that express an increased degree of intimacy are used corresponding to an increase in the tilts of two faces side-by-side in directions approaching each other, as the feeling-expressing-words corresponding to the number of dynamic bodies, words that express a degree of clamor at a scene are used in proportion to the number of dynamic bodies, as the feeling-expressing-words corresponding to the dynamic body transition information, words are used which express a repetitive movement corresponding to a periodicity that is recognized based on the dynamic body transition information, and as the feeling-expressing-words corresponding to the luminance change, words expressing a situation where lighting is turned on are used when luminance changes to a first value and words expressing a situation where lighting is turned off are used when luminance changes to a second value that is lower than the first value.

8. A non-transitory computer readable medium storing a feeling-expressing-word processing program which causes a computer to execute the method according to claim 7.

\* \* \* \* \*